United States Patent [19]
Delatorre

[11] Patent Number: 5,363,703
[45] Date of Patent: Nov. 15, 1994

[54] DUAL TRANSDUCER

[75] Inventor: Leroy C. Delatorre, Sugar Land, Tex.

[73] Assignee: Panex Corporation, Sugar Land, Tex.

[21] Appl. No.: 86,086

[22] Filed: Jul. 6, 1993

[51] Int. Cl.$^5$ ............................................. G01L 9/12
[52] U.S. Cl. .................................. 73/733; 361/283.3
[58] Field of Search ................. 73/733, 718, 724; 361/283, 283.3, 283.4

[56] References Cited
U.S. PATENT DOCUMENTS

| | | | |
|---|---|---|---|
| 4,873,870 | 10/1989 | Delatorre | 73/733 |
| 5,168,419 | 12/1992 | Delatorre | 73/733 |
| 5,207,767 | 5/1993 | Delatorre | 73/733 |
| 5,230,250 | 7/1993 | Delatorre | 73/733 |

*Primary Examiner*—Donald Woodiel
*Attorney, Agent, or Firm*—Donald H. Fidler

[57] ABSTRACT

A pressure transducer system for developing accurate pressure measurements with a torque driven pressure transducer where the transducer has dual capacitor devices in tandem and mechanically coupled to permit relative displacement along a elongated axis in response to temperature and where the devices are displacable by angular torque about the elongated axis to obtain independent correlatable measurements from the dual capacitor devices.

31 Claims, 5 Drawing Sheets

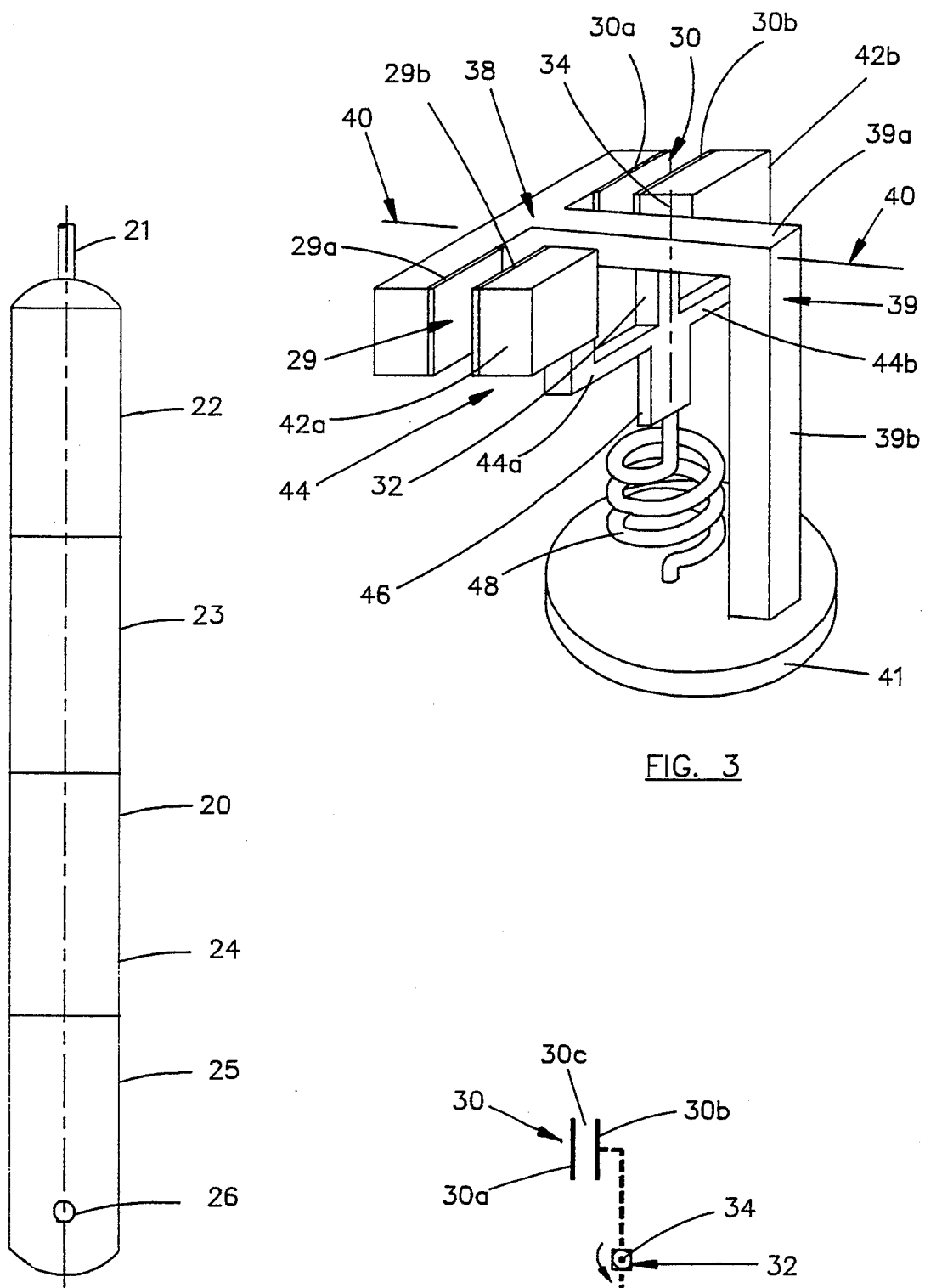
FIG. 1
FIG. 3
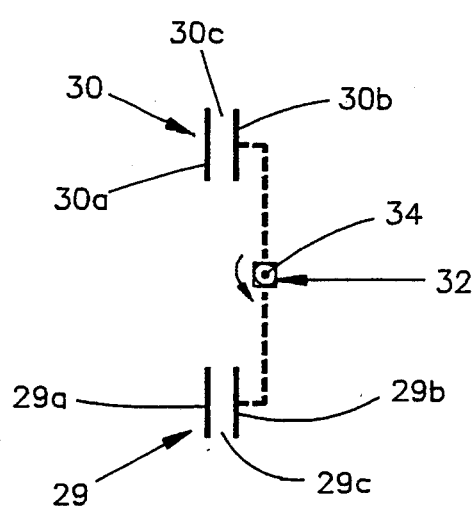
FIG. 2

DUAL TRANSDUCER

RELATED APPLICATIONS

This application is related to Ser. No. 770,352 filed Oct. 3, 1991 and entitled, CAPACITOR AND PRESSURE TRANSDUCER.

FIELD OF THE INVENTION

This invention relates to capacitors and pressure transducers and more particularly to relatively small capacitors utilizing micro-displacements for use in high pressure transducers requiring a wide pressure range of operations under changing temperature conditions and for producing pressure measurements with a high degree of accuracy.

BACKGROUND OF THE INVENTION

While the present invention finds particular usefulness in the oil industry, it has particular application in other hostile pressure and temperature environments where size of the transducer and accuracy of the measurements are important.

In an oil well pressure transducer, it is common to size a sensor unit to go into a small diameter metal pressure housing for measurement of pressures up to 20,000 psi and even more and which can be subjected to downhole temperatures up to 400° F. or more. The pressure housing must have a wall thickness sufficient to withstand the downhole pressures so that the O.D. of the internal pressure transducer or sensor is in the neighborhood of one inch in diameter.

A downhole oil well transducer or pressure gauge can be transported by a wireline, cable or pipe string to one or more levels of interest in a well bore where both temperature and pressure are sensed over a period of time. Typically, pressure measurements are repeatedly sampled and recorded over a period of time at a sampling rate determined by down hole electronics and may be stored in a downhole memory for subsequent replay or sent to the surface of analysis. Alternately, sometime pressure gauges are attached to production strings or other downhole equipment for measurements over extended periods of time or "permanently". In both uses of a pressure gauge, sudden downhole pressure changes can also typically accompanied by a temperature change in a relatively short period of time. It is also important for the accuracy of the pressure sensor to not change its calibration over a period of time in the borehole in response to pressure or temperature effects in the boreholes. Thus, there is a need for a pressure gauge for high pressure measurements which is also insensitive to sudden changes in temperature or effects of pressure. The present invention relates to high pressure transducers which can accurately measure high pressure changes under transient temperature conditions independently of the temperature changes.

Under the combined effect of high temperature and pressure conditions, the typical pressure sensor structure is subjected to high stress by the applied high pressure and subjected to high temperature both of which cause creep in the materials of the sensor structure. Creep in materials tends to be exponentially related to both temperature and stress levels. The effect of creep or permanent deformation in materials is to alter the calibration or measurement characteristics of a sensor and cause the sensor to obtain inaccurate measurements from its calibration standard over a period of time.

Heretofore, capacitance type transducers have been utilized for pressure measurements where a downhole oil well pressure varies an electrical capacitance as a function of pressure. The pressure is translated to a capacitance measurement by a pressure diaphragm moving parallel arranged capacitance plates toward and away from one another. An example of the kind of device is shown in U. S. Pat. No. 4,322,775.

I have also coupled a Bourdon tube to a capacitance type of sensor such as disclosed in U. S. Pat. No. 4,873,870 in which the pressure in the bourdon tube generates a directional linear force to displace quartz supported parallel arranged capacitor elements toward and away from one another. While this device is satisfactory for a number of applications, it is a difficult unit to manufacture.

One of the major concerns in utilizing downhole pressure sensors is that a downhole transducer malfunction can lose data or require re-running the downhole testing program with a different transducer. This can involve considerable expense and lost time. Another concern with the type of transducer disclosed herein is temperature sensitivity of different materials which can cause a drift of the measured pressure values over a period of time.

In the present invention, I have developed a capacitor device which has a unique relationship of capacitors that can be constructed from metals to respond to low force inputs and be relatively insensitive to temperature changes and has a redundancy feature to avoid abortion of a pressure testing program because of a malfunction. The capacitor device is particularly adaptable to measurement of high pressure with a high degree of accuracy and repeatability over a period of time.

As an example of probabilities of malfunctions, if one hundred single pressure sensors have a 5% failure rate then one unit out of every 20 units would fail in use. On the other hand if you have one hundred tandem connected pressure sensors with the same failure rate per unit, the probability that both sensors of a tandem unit will simultaneously fail is one out of 400 units. Thus, redundancy by use of tandem transducers can build substantial reliability into a downhole pressure sensor. Redundancy, however, also creates temperature problems since a transducer is matched to a base support with respect temperature expansion characteristics and separately mounted transducers can have different temperature expansion characteristics. The present invention provides for both redundancy and temperature compensation.

SUMMARY OF THE INVENTION

In the present invention, a transducer has dual capacitors which are defined by spaced apart capacitor plates respectively located on capacitor base members. The capacitor base members are vertically arranged in a pressure housing. The capacitor plates for each capacitor are disposed at equally offset locations relative to a central vertical axis for the device so that a capacitor is located on either side of the central vertical axis. One of the capacitor base members can be angularly torqued (displaced) about the central vertical axis by an applied torque force to dependently vary the respective capacitance of the capacitors. The angular torque displacement is obtained by a spirally wound Bourdon tube which, when subjected to internal fluid pressure, produces a torque about the central vertical axis.

The Bourdon tube is attached to the displaceable capacitor base member and to a reference base member and provides a torque force to capacitance torque beams in the angularly displaceable capacitor base member. Although the Bourdon tube can be subjected to high pressures, the stress levels in the metal Bourdon tube can be designed to be well within its elastic limits because only a low force is required to obtain a micro displacement of the torque beams and the capacitor base member and to obtain micro measurements by the capacitors. Micro displacements of the capacitors are easily measured. Thus, creep and permanent distortion in the materials, which are caused by stress, are minimized in the system. Further, the effect of Bourdon tube creep is reduced by the constraining effect of the torque beams as will be described more fully herein.

A high capacitance sensitivity can be obtained with low angular deflection by arranging the capacitor base members so that related capacitance between capacitor plates are varied as a function of an angular relationship of the capacitor plates relative to a mid-plane. That is, a micro dimensional change in the capacitor gap produces a defined measurement parameter. The high sensitivity is obtained by measurement of a small displacement of the capacitor plates at a significant distance from the center of angular displacement (the displacement or central vertical axis). The elastic characteristics of a metal torque beam means coupled to the force end of the spirally wound Bourdon tube by a torque coupling become the primary determining element relative to elastic properties.

The reason that the torsion beam means is a primary determining element is that the deflection of the Bourdon tube is restrained by the torsion beam means to be a small fraction of the unrestrained deflection of the Bourdon tube. Thus, the deflection of the Bourdon tube is controlled by the elastic characteristics of the torsion beam means and the Bourdon tube becomes essentially a pressure to force converter. By using a low driving torque force of a Bourdon tube (even for high pressure) and a minute angular deflection of the torsion beam means, the stress levels in the Bourdon tube and particularly in the torque beam means can be kept well within micro-elastic limits. High performance metal alloys can then be used to provide correspondingly high micro yield values so that near perfect elastic characteristics are attainable in the operating range of the transducer.

Temperature is an important factor because it can affect the calibration of the sensor. While a pressure measuring device at an ambient temperature can be generally corrected by measured temperature, a change of temperature from an ambient value can thermally affect the response of the pressure measuring device to pressure which affects the accuracy of the pressure measurement. Changes in temperature often occur with changes in pressure so it is important to accurate pressure measurement for the pressure measuring device to be insensitive to changing or varying temperatures or to compensate for the changing temperatures.

In the present invention, upper and lower transducers with similar torque beam constructions are connected in a vertical and tandem arrangement where the upper and second transducer has one of the capacitor base members mechanically coupled to a similar one of the capacitor base members of the first and lower transducer. The other base members of the first and second transducers are connected to a common support base. The first and second transducers are in vertical alignment with one another. A coupling system is arranged to interconnect the upper and lower transducers and to permit relative vertical displacement between the coupled base members so that vertical displacement due to temperature effects on one of said base members is isolated from the other base member. The coupling system, however, is arranged to be rigid with respect to displacement of the coupled base members about the vertical displacement axis so that each base member is responsive to the angular displacement obtained by the spirally wound Bourdon tube.

Each transducer has an independent electrical system and the measured parameters from each of the transducers is independently derived. Thus, if one transducer should fail the other transducer can be relied upon to obtain the measurements.

DESCRIPTION OF THE DRAWINGS

FIG. 1 is a typical arrangement for an oil well pressure measuring device as found in current use;

FIG. 2 is a schematic illustration of the concept embodied in the present invention;

FIG. 3 is a schematic view in perspective of a structural relationship for the invention;

DESCRIPTION OF THE PRESENT INVENTION

Figure 4:
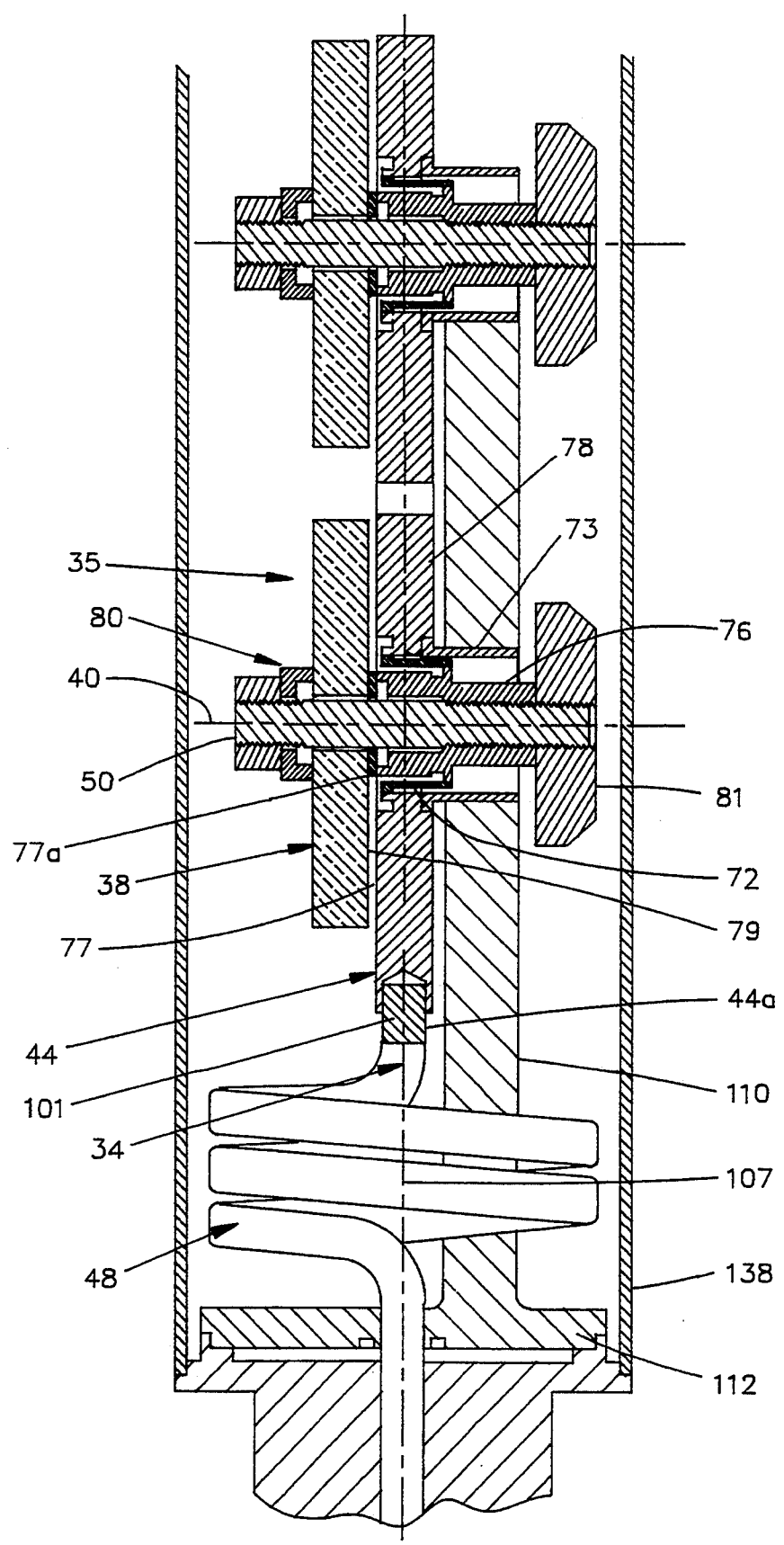
FIG. 4 is a view in longitudinal cross section through a vertical central axis of one form of the present invention.

By way of background, as shown in FIG. 1, a downhole cylindrically shaped well tool 20 is sized for insertion through a small diameter well tubing and adapted for coupling to the end of a wireline cable 21. The cable 21 extends to a surface located spooling reel or drum (not shown). The tool 20 generally includes a DC battery pack section 22, as a source of electrical power, an electronic section 23 with electrical circuitry for electrically processing and for providing electrical power, a temperature sensor section 24 with a temperature probe for sensing temperature and a pressure sensor section 25 with a pressure transducer for sensing pressure. An opening 26 admits fluid under pressure to the pressure sensor or the transducer in the sensor section 25. For further reference purposes, see U.S. Pat. No. 4,763,259.

In permanent gauge installations the temperature and sensor sections are incorporated with downhole equipment for permanent position or location in a well bore.

Referring now to FIG. 2 and FIG. 3, the operating concept of the apparatus of the present invention for a single transducer is schematically (but disproportional) illustrated for descriptive purposes. In FIG. 2, separate electrical capacitors 29, 30 are illustrated where the capacitor 29 has parallel capacitor plates 29a, 29b which are separated by a capacitance gap 29c. The capacitor 30 has parallel capacitor plates 30a, 30b which are separated by a capacitance gap 30c. The plates 29a, 30a are fixed and in a common plane transverse to the plane of the drawing and the plates 29b, 30b are in a parallel common plane. The plates 29b, 30b are attached (see dashed line) to a torsion beam means 32. The beam means 32 has a torque axis 34 in a transverse plane and can be torqued about its axis 34 to angularly displace the common plane for the plates 29b and 30b and dependently alter the capacitance of the capacitors 29, 30.

As shown schematically in more detail in FIG. 3, the capacitor plates 29a, 30a are on a fixed base member 38 and are located equidistant from a central horizontal axis 40. A support means 39 with a horizontal extension 39a and a vertical extension 39b is fixed to a lower base member 41.

The capacitor plates 29b and 30b are located on elements 42a, 42b of a base member 44. The elements 42a, 42b are connected by horizontal extensions 44a, 44b to a vertical torque coupling element 46 are connected by a vertical torsion beam element 32 to the support means 39. The torque coupling element 46 is connected to the stub or closed end of a spirally would Bourdon tube 48. The open end of the Bourdon tube 48 passes through the base member 41 and is attached thereto. The axis 34 of the torsion beam element 32 and the coil axis of the Bourdon tube 48 are aligned on a common vertical axis and intersect the horizontal axis 40. The axes 34 and 40 defined a vertical plane.

It can be appreciated that the structure is arranged so that an applied pressure in the Bourdon tube causes the Bourdon tube to develop a torque force which is applied to the beam element 32 so that the plates 29b and 30b are angularly displaced by torque about the vertical displacement axis 34 and dependently change the capacitor gaps 29c, 30c. Thus, separate capacitors respectively utilizing the capacitance plates 29a, 29b and 30a, 30b will have dependently related capacitance changes in response to rotative displacement. As will be discussed herein, the torque displacement is in micro dimensions which reduces the stress in the torsion beam element.

From the foregoing basic illustration of a concept of the present invention, it can be appreciated that a Bourdon tube is utilized to develop a low torque force in response to high pressure which acts on a torsion beam member about a vertical displacement axis and produces a micro dimensional deflection of dependent capacitors. By maintaining the amount of deflection within the micro-elastic characteristics of the material for the beam member and utilizing low torque forces, the stress levels in the beam member can be kept low which permits high accuracy and repeatable measurements. The high accuracy measurements are obtainable because permanent distortion of the material stress does not appreciably occur and consequently does not affect the measurements. Material criterion for the torsion beam element is that the material should have a micro yield and micro creep point which is above the stress level produced by a torque force.

Figure 5:
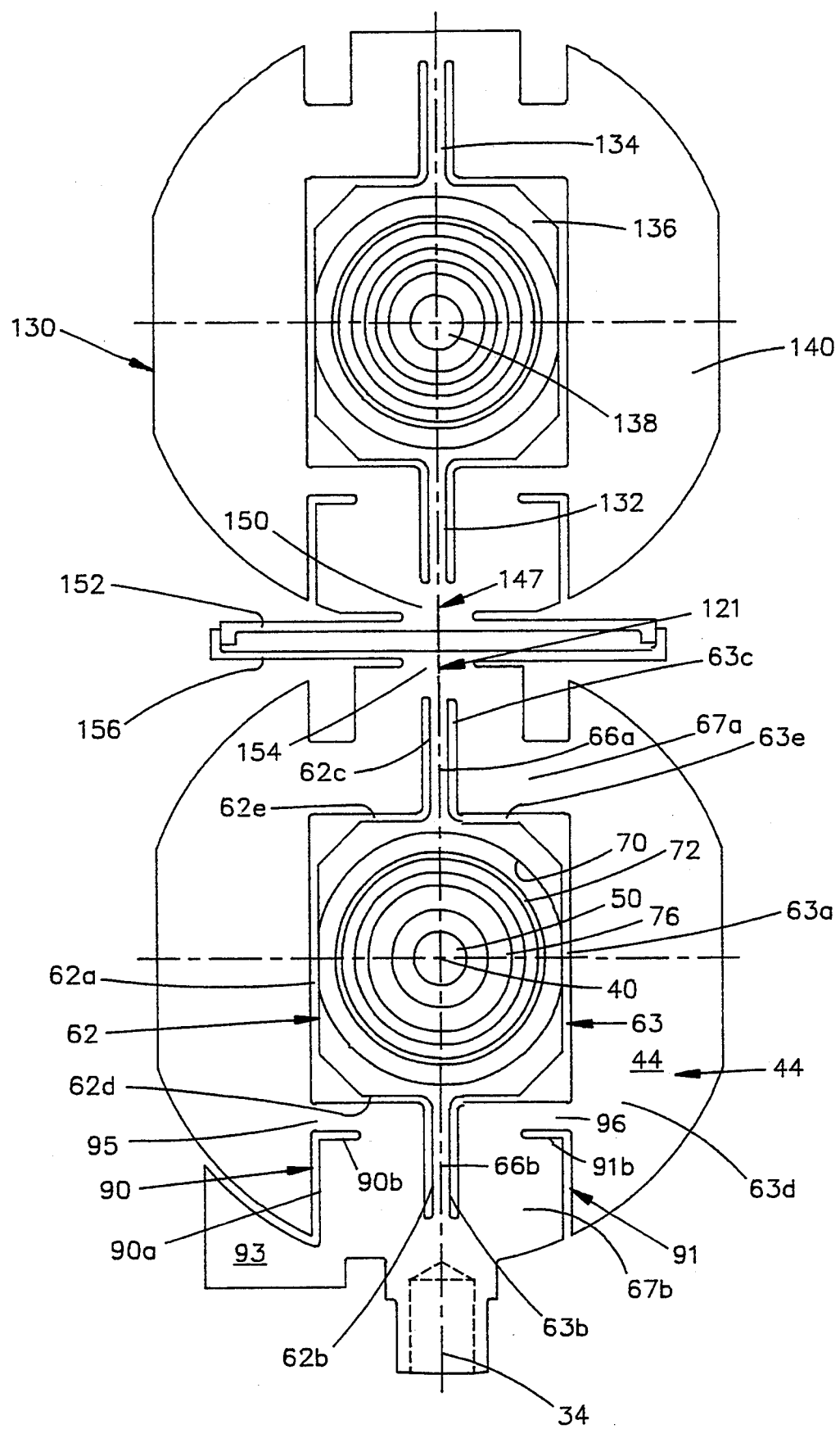
FIG. 5 is a plan view of the tandem capacitor base members of the invention.
Figure 6:
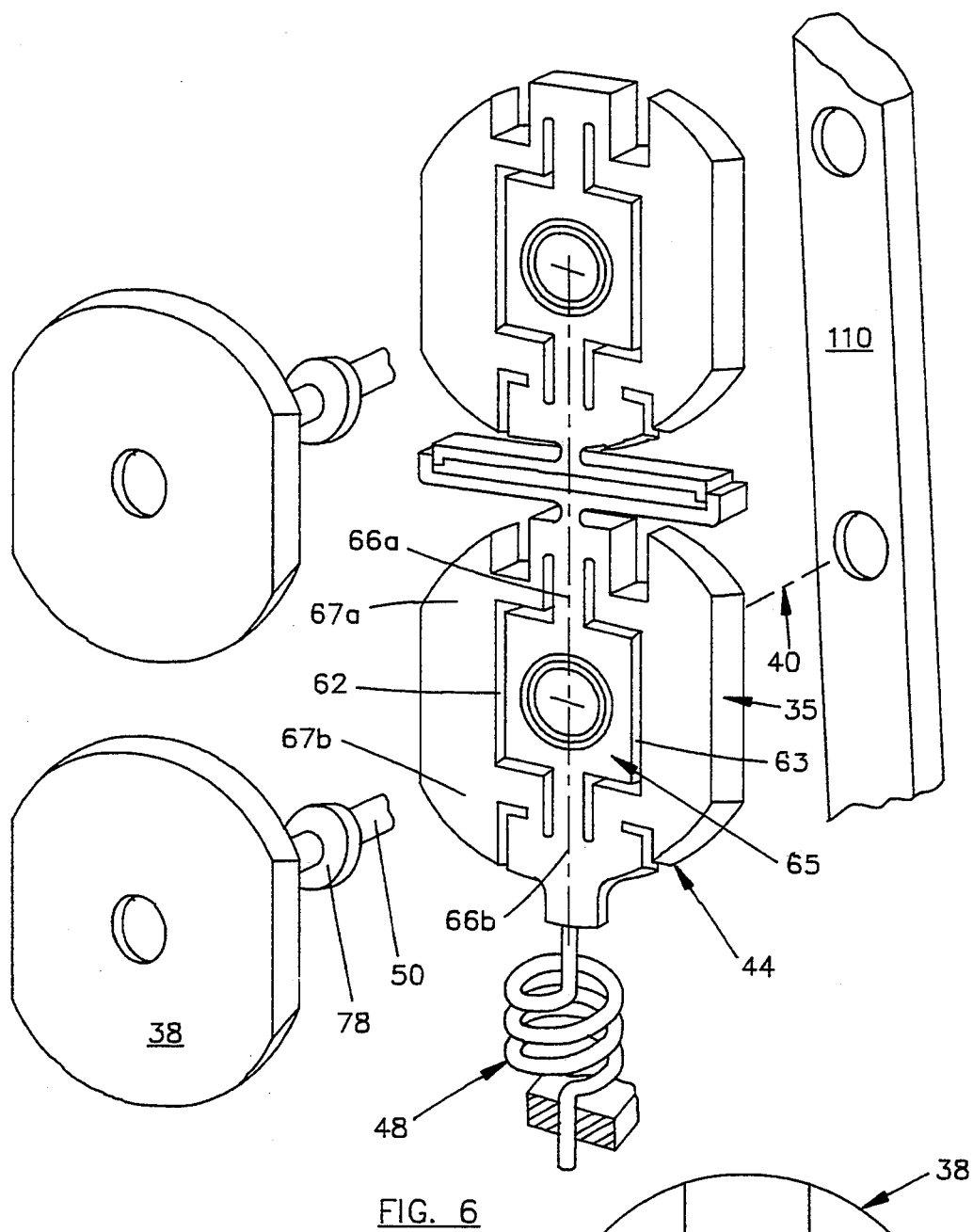
FIG. 6 is a schematic view in perspective of a structure relationship in the present invention.

Referring now to FIGS. 4, 5 and 6, a more detailed illustration is provided for the capacitor arrangement of the present invention. In the illustration, the structure of a capacitance sensor includes a first lower transducer 35. The lower transducer 35 (FIG. 4) has an elongated, cylindrically shaped central fastener rod 50 with a central longitudinal axis 40. In FIG. 4, the axis 40 is shown in a horizontal position. The axis 40 is normal to the planes of the capacitor plates on spaced apart first plate base member 38 and second plate base member 44 where the planes would be transverse to the plane of the drawing. The rod 50 is part of the support means which couples a first vertical capacitor plate base member 38 to a fixed center section 65 (See FIG. 6) in the second vertical capacitor plate base member 44. The center section 65 is fixed or attached to a vertical support member 110 as will be explained hereafter.

The first base member 38 is formed from a cylindrically shaped member and is made of a material having inherently dimensional stable characteristics under changing environmental conditions such as temperature and time aging. Quartz is a suitable material.

As shown in FIG. 5 and FIG. 6, the second capacitor base member 44 is formed from a cylindrically shaped metal plate member and has a first slot configuration of mirror arranged slot systems 62, 63 which are defined by spaced apart wall surfaces and which are tortuously located in the body of the second base member 44. The first slot configuration provides or defines the central plate section 65 and spaced apart torsion beam members or sections 66a, 66b which connect to outer plate sections 67a, 67b (See FIG. 5). The beam members 66a, 66b are rectangular shaped in transverse cross section with a narrow dimension in the plane of the drawing (FIG. 5) and a long dimension in a transverse plane (See FIG. 4). The beam members 66a, 66b are adapted to be torqued about a central vertical torque or displacement axis 34 where the torque or displacement axis 34 is located centrally of the beam members 66a, 66b and on a vertical median plane extending through the second base member 44. The displacement axis 34 also intersects and defines a vertical plane with the axis 40. The displacement axis 34 is parallel to the parallel planes in which the capacitor plates are located.

The central section 65 thus is a generally rectangularly shaped member defined between the slots systems 62 and 63 which are symmetrically arranged with respect to a central displacement axis 34. The outer sections 67a, 67b of the second base member 44 are attached by the torsion beam members 66a, 66b to the central section 65 along the central axis 34.

As shown in FIG. 5, the slot system 62 has a central vertically walled portion 61a connected to parallel displaced walled end portions 62b and 62c by transversely arranged wall slot portions 62d and 62e. The slot 63 has similarly arranged portions 63a, 63b, 63c, 63d and 63e relative to the slot system 62. The spacing between the end portions 62b, 63b and 62c, 63c of the slots 62 and 63 define the narrow width dimension of the beam members 66a and 66b. The length of the slot portions 62b, 63b and 62c, 63c also defines the length of the beam members 66a and 66b.

Referring to FIG. 5, in the center of the central section 65 and the base member 44 is a mounting bore 70 which is centered on the axis 40. The bore 70 receives an annular outer tubular support ring 72 (see FIG. 4). The outer support ring 72 is welded about its periphery at its end surface to the central section 65. Disposed within the outer support ring 72 (See FIG. 4 & 5) is an annular inner tubular support member 76 which is attached to the rod SO.

Referring to FIG. 4, the inwardly facing planar surface 77 of the outer plate sections of the second base member 44 is on the same vertical plane as the upper surface 77a of the center section 65. The facing surface 79 of the first base member 38 is parallel to the surface 77 of the second base member 44. Between the inner support member 76 on the second base member 44 and the first base member 38 is a disc shaped spacer member 78. The spacer member 78 effectively defines the capacitance gap for capacitor plates on the surfaces 79 and 77.

The rod 50 is threadedly attached to the support member 76 and extends through a centrally located opening on the first base member 38. A clamping means 80 threadedly attaches to the rod 50 so that the first and second base members 38 and 44 are assembled in a unitary assembly. A portion of the rod 50 extends outwardly of the support member 76 and is threadedly attached and welded to a balance mass 81. The balance mass 81 overcomes gravity effects when the device is in a horizontal position. The spacer member 78, the rod 50, the clamping means 80, and the support member 76 can be made from a material which is selected to have similar temperature expansion characteristics to the selected material for the base member 38. A metal material such as Invar or the like is suitable. The base member 44 is made from a high strength material, such as a maraging stainless steel with good elastic characteristics for the torsion beam members. The steel base member 44 also will provide an electrical ground for the capacitor electrical system. By way of illustration, the coefficient of expansion for various materials averages (at room temperature) as follows:

| Invar | 0.2 parts/million/°F. |
|---|---|
| Maraging Steel | 6 parts/million/°F. |
| Quartz | 0.3 parts/million/°F. |

Figure 7:
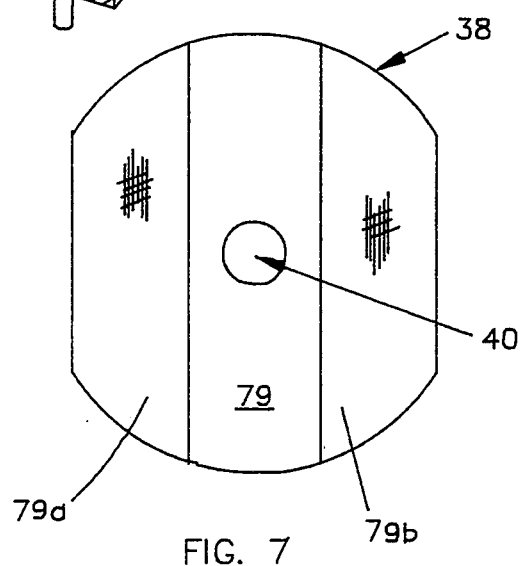
FIG. 7 is a plan view of the a surface of a base member.

The first capacitor base member 38, as noted before, made from a cylindrically shaped member preferably constructed from a quartz material and has first and second independent capacitance plate films 79a and 79b (See FIG. 7) which are sputtered in separate locations onto a surface 79 of the base member 38. The capacitance plate film 79a is arranged in spacial alignment with the planar surface 77 on the second capacitance base member 44. Connection is made to the edge of the quartz plate. Electrical wire conductors are then connected to each capacitor film plate for separate capacitor measurements. On the surface 77, facing capacitance plate films 77a, 77b on an insulator base (See FIG. 4) are provided, if desired, or the metal can be used as a ground surface in a grounded electrical capacitance system.

As shown in FIG. 4, the planar surface 79 on the first base member 38 is arranged normally parallel to the planar surface 77 on the second capacitor base member 44 and is normally separated therefrom by a capacitor spacing distance or gap. The capacitance plate films 79a and 79b which are offset to either side of the central horizontal axis 40 and to either side of the vertical plane through the displacement axis 34. The plate films 79a and 79b are parallel to the planar surface 77 on the base member 44. The widths of the capacitor gaps between the respective plate films 79a, 79b and the surface 77 is basically defined by the width of the spacer member 78. It can thus be appreciated that the clamping means 80 on the fastener rod 50 attach the first capacitor base member 38 to the inner support ring 76 and, in turn, to the central section 65 of the second capacitor base member 44.

Referring again to FIGS. 5 and 6, the second capacitor base member 44 is also provided with a second vertical wall slot system comprised of angular "L" shaped slots 90 and 91 which are symmetrically arranged with respect to the axis 34. The sidewalls of the slot portion 90a of the sidewalls of slot 90 align with the sidewalls of the slot portion 62a of the slot 62. The sidewalls of the slot portion 91a of the slot 91 align in vertical planes with the sidewalls of the slot portion 63a of the slot 63. The sidewalls of the slot portions 90b and 91b of the slots 90, 91 are aligned in horizontal planes with one another and are perpendicularly arranged relative to the displacement axis 34. It can be seen that the slot portions 90b and the slot portions 91b, respectively, define transverse beam portions 95, 96 about an axis perpendicular to the displacement axis 34. The purpose of this arrangement is to minimize temperature effects by providing an equal and accurately controlled heat conduction path to each capacitance side.

The torquing of the beam members 66a, 66b on the central section 65 of the base member 44 is accomplished by a spirally wound Bourdon tube 48 (FIGS. 4 & 5). The Bourdon tube 48 has a closed stub end 101 (FIG. 5) which is aligned with the displacement axis 34 and is attached to the torque coupling element 44a of the base member 44. The spirally wound Bourdon tube 48 has a central vertical coil axis 107 which aligns with the displacement axis 34. When the Bourdon tube is subjected to internal pressure it will produce a torque force about the axis 34 and the axis 107. As shown in FIG. 5, the base member 44 has a weight portion 93 to one side which provides for balancing of the unit to the effects of gravity.

The assembly of the base members 38 and 44 is supported on a vertical support member 110 and the mounting beam 73 welded to the support member 110. The support member 110 is attached to a cylindrically shaped base member 112 which couples to a pressure inlet. The open end of the Bourdon tube 48 extends through an opening in the base member 112. The tube 48 is welded to the support member 110, 112 so that the Bourdon tube is fixed in position between the base member 110 and the base member 44.

As may be appreciated from FIGS. 4 and 6, the base member 38 and the support member 110 constitute a first expansion unit assembly and the base member 44, and the Bourdon tube 48 constitute a second expansion unit assembly. Temperature changes produce equal displacement of the second expansion unit assembly relative to the first expansion unit assembly and compensate for changes in dimensions due to temperature. Even if not exactly equal, the difference in displacement is absorbed by the coil of the Bourdon tube without producing a significant torque effect. In practice, a metal cylindrical enclosure housing 138 encloses the capacitance at a vacuum or contains inert gas.

One of the features of the present invention is the arrangement which enables use of micro-elastic characteristics of metals. By way of definition, the macro yield point of a metal can be defined as the point where the metal has a set or plastic strain (permanent deformation) of 0.2% or two parts per thousand. The micro yield point of a metal is defined as the point where the metal has a set in a range of 0.01% to 0.0001% or one part per ten thousand to one part per million. In utilizing micro-elastic characteristics, a low or small force produces a small deflection. As an example, a 0.3 inch pound torque is used to produce a capacitance deflection of 0.001 radians. This arrangement permits measurement of high pressure 10,000–15,000 psi or more by utilizing a Bourdon tube coupled to a capacitor transducer. The capacitor transducer utilizes a relatively small deflection so that the primary determining element is the torque beams which have very low stress levels. The Bourdon tube then operates in an essentially constrained mode as a pressure to force converter. Additionally since the stress levels in the torsion beam members are in the micro-elastic range, the elastic characteristics of the torsion beams can approach nearly ideal performance. Ideal performance is approached by the diminishing effect of hysteresis creep, and no-linear response as stress levels are reduced.

The stress levels in obtaining micro-elastic characteristics are low because the deflection required for the capacitor sensor can be small, for example 0.001 radians. The beam members providing the displacement axis are stiff or rigid and the torque force applied is low, for example 0.3 inch pounds.

By way of example, the diameter of the base member 38 is about 0.850 inches. The diameter of the base member 44 is about 0.900 inches and 0.125 inches thick. The width of the slots is about 0.020 inches. The spacer 78 is 0.001 inches thick.

While the preferred embodiment is to exploit micro yield characteristics to produce accuracy and repeatability, macro yield materials may be suitable for some applications.

A Bourdon tube as contrasted to a circular tube has a flattened or ovular cross section as compared to a circular cross section. In high pressure applications a flat oval cross section is commonly employed. In a flattened cross section, internal pressure produces higher stress in the wall because the member tends to move toward a circular cross sectional form. When a tube member with a flattened cross section is spirally wound, internal pressure tends to uncurl the spiral. The flatness of the tube, the coil diameter and the wall thickness also have a bearing on the stress.

In the present invention, the spiral closed end 101 of a spirally wound flattened Bourdon tube is connected to a metal base member 44 which is constructed to enable torsional deflection of a beam member as a function of the applied pressure in the Bourdon tube. As shown in FIGS. 4 and 6, there are two complete turns of the Bourdon tube which have a non-circular cross-section between the circular end pieces 101a, 101b. It is preferable to have an even number of turns in the Bourdon tube. Bourdon tube design is well known, and the design should minimize the stress in the Bourdon tube to develop a low force for the beam members. There is zero force on the capacitance plates. In short, the capacitance members are moved relative to one another by angular torque deflection of the capacitor base members. Because the force moment of the Bourdon tube is small, the stress level in the torque beam can be kept low. The use of high performance metal alloys can then provide near perfect elastic and stability characteristics of the torsion beam.

The effect of temperature on the torque output of a Bourdon tube is minimized because the differences in linear expansions produce a very small corresponding change in torque and the capacitance plate structure which significantly rejects any displacement other than torque.

Temperature can also affect the capacitance structure. The top base member of the capacitor is preferably a low expansion material which is dimensional stable, such as quartz. The lower capacitance member is preferably made of the same material as the torque beam to avoid welds.

The two capacitance plates are respectively mounted by aligned connections to a base member which, in turn, is attached to another mass. Since the structure is mounted in a vacuum, temperature change of the capacitance plates is affected primarily by thermal conduction through the mountings.

The electronics used for this sensor can be as described in U.S. Pat. No. 4,091,693. A ratio metric measurement is made using the relationship $(C_1-C_2)/(C_1+C_2)$ so that the oscillator factor cancels out the reading. One of the important features of the present invention is that the capacitor can operate with minute deflection changes and produce measurable signals.

Figure 8:
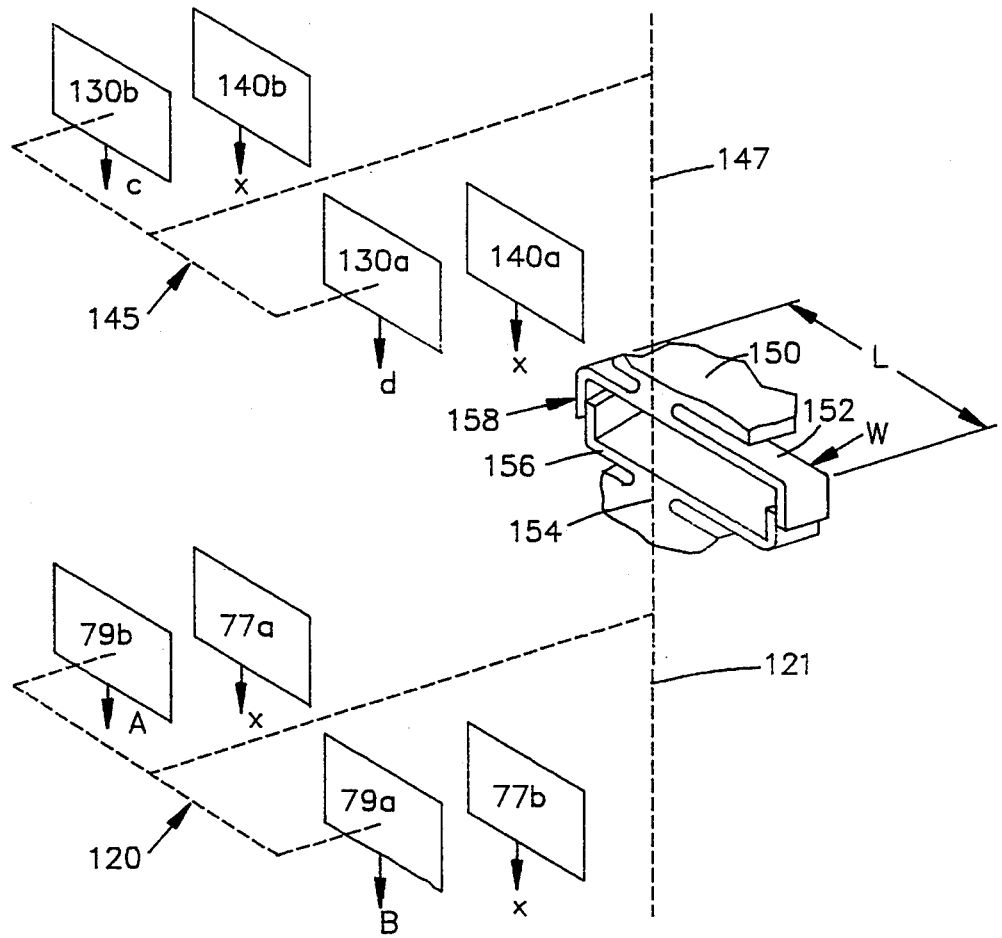
FIG. 8 is a schematic view in perspective to illustrate some relationships of the present invention.

Referring to FIG. 8, a schematic illustration shows the capacitor plates 79a, 79b (base member 38) spaced parallel from plate surfaces 77a, 77b (base member 44). A dashed line 120 indicates a mechanical coupling to a vertical torque displacement axis 121. A second upper sensor 130, as shown in FIG. 5, is constructed and arranged with an identical arrangement of torsion beams 132, 134 and a central section 136 connected to a connector rod 138. The upper sensor 130 has capacitor plates 130a, 130b which are spaced apart from capacitor plates 140a, 140b on an outer base member 140 (see FIG. 8). A dashed line 145 indicates a mechanical coupling to a vertical displacement axis 147.

The upper base member 140 has a necked down connector portion 150 which connects to an elongated transverse bar member 152. The bar member 152 in cross section has a relatively long width dimension "W" as compared to it's depth dimension "D". The length "L" of the bar member 152 is sufficient to permit flexibility and to allow relative vertical movement of the base member 140 of the upper transducer should the temperature effects on the support member 110 cause a relative vertical movement of the upper transducer relative to the lower transducer.

The lower base member 44 has a necked down portion 154 which connects to an elongated transverse bar member 156. The elongated bar member 156 (similar to bar member 152) in cross section has a relatively long transverse width dimension "W" as compared to it's depth dimension "D". The length of the bar member 156 is sufficient to permit flexibility and allow relative vertical movement of the base member 44 of the lower transducer should the temperature effects on the support member 110 cause a relative vertical movement of the upper transduced relative to the lower transducer.

It can thus be appreciated that while temperature effects on the upper and lower transducers can move the transducers vertically relative to one another, the effects do not adversely impact the transducers. The bar members 152, 165 are electron beam welded at their ends 158 and the cross-sectional configuration provides rigidity in the plane normal to the axis 147, 121 so that torque effects on the lower base member are transmitted without loss to the upper base member.

Figure 9:
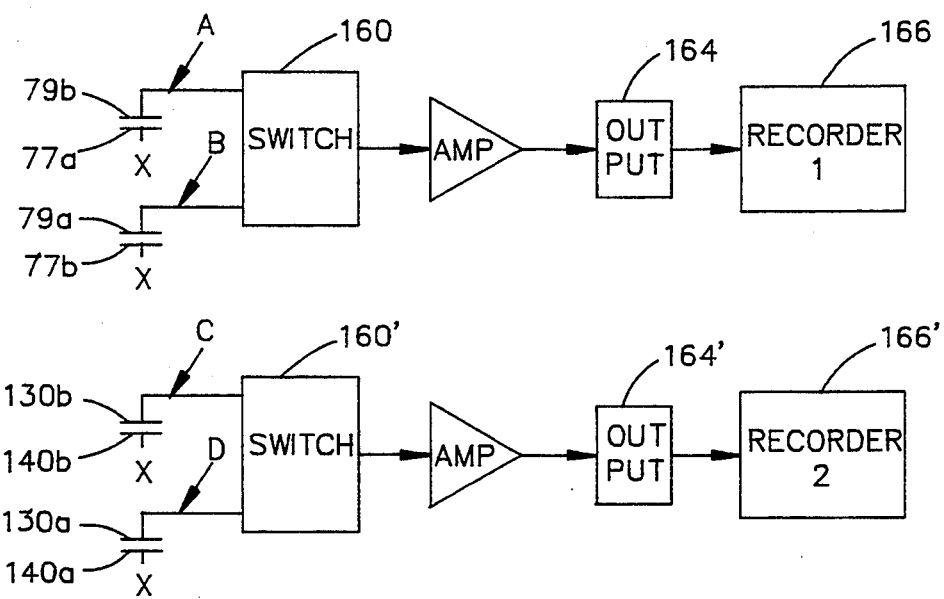
FIG. 9 is a schematic illustration of electrical systems suitable for the present invention.

As shown in FIGS. 8 & 9, the capacitor plates 140a, 140b, 77a, 77b are connected (connection "X") to a common electrical ground or other electrical reference. The capacitor plates 79a, 79b are connected to a switch circuit means 160 which alternately samples the capacitances of the respective capacitors. The capacitance outputs are amplified and transmitted to an output circuit means 164 which derives a ratio signal output for transmittal and storage in a recorder or memory bank 166. Similarly, the capacitor plates 130a, 130b are connected in an independent electrical channel system to a switch 160', amplifier, output circuit 164' and recorder or memory bank 166' which are duplicate to the other electrical channel system. Thus two independent measurements are derived by independent systems.

It can be appreciated that the independent systems provide significant reliability against malfunctions and derive independent measurements which provide significant reliability against electrical malfunctions and also provide for cross checking of measurements. All of the forgoing is accomplished with provisions for temperature compensation so that temperature effects are isolated between each of the transducers. It will be apparent to those skilled in the art that various changes may be made in the invention without departing from the spirit and scope thereof and therefore the invention is not limited by that which is enclosed in the drawings and specifications but only as indicated in the appended claims.

I claim:

1. A tandem capacitor device for utilizing dependent capacitances for measurement purposes comprising:
   a first dual capacitor having a first capacitor base member and a second capacitor base member arranged with parallel capacitor surfaces in parallel planes where facing parallel capacitor surfaces are located on opposite sides relative to a transverse central plane and where said facing capacitance surfaces respectively define first and second capacitors;
   said second capacitor base member having a centrally located section connected to an outer section of said second capacitor base member by torsion beam means, said centrally located section being attached to said first capacitor base member by attachment means;
   said torsion beam means having a displacement axis parallel to said capacitor surfaces so that angular torque displacement of said outer section of said second capacitor base member relative to said centrally located section about said displacement axis produces a capacitance change in said first and second capacitors;
   force means coupled to said outer section of said second capacitor base member for producing a torque force on said torsion beam means for developing angular displacement of said outer section and a capacitance change as a function of said torque force;
   a second dual capacitor having a third capacitor base member and a fourth capacitor base member arranged with parallel capacitor surfaces in parallel planes where facing parallel capacitor surfaces are located on opposite sides relative to said transverse central plane and where said facing capacitance surfaces respectively define third and fourth capacitors;
   said fourth capacitor base member having a centrally located section connected to an outer section of said fourth capacitor base member by torque beam means, said centrally located section being attached to said third capacitor base member by attachment means, said last mentioned torque beam means being aligned with said displacement axis;
   coupling means for rigidly coupling said second and said fourth capacitor base members to one another for simultaneous angular torque displacement of said outer section of said fourth capacitor base member and said second capacitor base member to produce a simultaneous capacitance change in said first and second dual capacitors.

2. The capacitor device as set forth in claim 1 wherein the torque beam means has a rectangular cross section with long and short dimensions relative to said displacement axis, and where the surface of said torque beam means are parallel to said displacement axis and wherein said long dimension is normal to the plane of said capacitor surfaces, and
   said force means includes a spirally wound Bourbon tube having a coil axis aligned with said displacement axis.

3. The capacitor device as set forth in claim 2 wherein said second and said fourth capacitor base members have a parallel walled slot means which define a central portion coupled to said attachment means and which define said torque beam means where said torque beam means connect to said outer sections of said second and said fourth capacitor base members.

4. The capacitor as set forth in claim 3 wherein said second and said fourth capacitor base members have a second parallel walled slot means which define transverse torque beam means where said transverse torque beam means are in said outer base portion of said second and said fourth capacitor base members and are located in a plane transverse to said central plane.

5. The capacitor device as set forth in claim 1 wherein the torque beam means are constructed from a high strength material having good elastic characteristics and wherein said force means is a Bourdon tube arranged in a coil about a coil axis for developing a torque force which does not exceed the micro yield point to the torque beam means and wherein said coil axis is aligned with said displacement axis.

6. The capacitor device as set forth in claim 1 wherein the torque beams means are constructed from a high strength metal material having good elastic characteristics with a macro yield point above the working stress levels in said torque beam means.

7. The capacitor device as set forth in claim 1 wherein the torque beams means are constructed from a material having good elastic characteristics with a micro yield point above the working stress levels in said torque beam means.

8. The capacitor device as set forth in claim 1 wherein the torque beams means are constructed from a high strength metal material having good elastic characteristics in the stress range of said torque beam means.

9. The capacitor device as set forth in claim 1 wherein the force means is a Bourdon tube arranged about a coil axis for developing a torque force which does not exceed the micro yield point of said torque beam means.

10. The capacitor device as set forth in claim 1 wherein said attachment means and said force means are connected to a common support means and said coupling means is constructed and arranged with flexible members to permit relative movement between said first and second dual capacitors to compensate for temperature effects.

11. The capacitor device as set forth in claim 10 wherein said flexible members have a cross section with structural rigidity about said displacement axis and structural flexibility along said displacement axis.

12. The capacitor device as set forth in claim 11 wherein said second and said fourth capacitor base members are constructed from a common high strength metal material having high strength and good elastic characteristics.

13. A capacitance transducer device for measuring pressure as a function of electrical capacitance comprising:

first and second capacitor devices for deriving capacitance measurements as a function of a torque force about a first elongated axis, said capacitor devices respectively having upper and lower base members disposed along said first elongated axis, said base members each having outer base portions coupled by torque beam portions to inner base portions so that said outer base portions can be torqued relative to said inner base portions, coupling means interconnecting adjacent outer base portions of the upper and lower base members to one another for providing a rigid torque coupling about said first elongated axis and for providing a flexible coupling along said first elongated axis;

support means coupled to said inner base portions, capacitor means on said inner base portions cooperating with capacitor means on said outer base portions so that torque in said outer base portions relative to said inner base portions develops capacitance measurements; and pressure responsive means connected between the outer base portion of the lower base member and said support means for developing torque in said outer base members in response to pressure.

14. The capacitor device as set forth in claim 13 wherein the torque beam means has a rectangular cross section with long and short dimensions relative to said elongated axis and where the surface of said torque beam portions are parallel to said elongated axis and wherein said long dimension is normal to a plane for said capacitor means, and said force means includes a spirally wound Bourbon tube having a coil axis aligned with said elongated axis.

15. The capacitor device as set forth in claim 14 wherein said outer base members have a parallel walled slot means which define a central portion coupled to said support means and which define said torque beam portions where said torque beam portions connect inner base portions to outer base portions.

16. The capacitor as set forth in claim 15 wherein said outer base portions have a second parallel walled slot means which define transverse torque beam means where said transverse torque beam means are in said outer base portions and are located in a plane transverse to said central plane.

17. The capacitor device as set forth in claim 13 wherein the torque beam portions are constructed from a high strength material having good elastic characteristics and wherein said force means is a Bourdon tube arranged in a coil about a coil axis for developing a torque force which does not exceed the micro yield point to the torque beam portions and wherein said coil axis is aligned with said elongated axis.

18. The capacitor device as set forth in claim 13 wherein the torque beams portions are constructed from a high strength metal material having good elastic characteristics with a macro yield point above the working stress levels in said torque beam portions.

19. The capacitor device as set forth in claim 13 wherein the torque beams portions are constructed from a material having good elastic characteristics with a micro yield point above the working stress levels in said torque beam portions.

20. The capacitor device as set forth in claim 13 wherein the torque beams portions are constructed from a high strength metal material having good elastic characteristics in the stress range of said torque beam portions.

21. The capacitor device as set forth in claim 13 wherein the force means is a Bourdon tube arranged about a coil axis for developing a torque force which does not exceed the micro yield point of said torque beam portions.

22. The capacitor device as set forth in claim 13 wherein said coupling members include flexible members having a cross section with structural rigidity about said elongated axis and structural flexibility along said elongated axis.

23. The capacitor device as set forth in claim 22 wherein said inner and outer base portions are constructed from a common high strength metal material having high strength and good elastic characteristics.

24. A pressure measurement system for use in hostile environments where temperature changes occur and where measurement accuracy is desired, said system comprising:

a dual capacitor measuring means for deriving two independent capacitance measurements as a function of one pressure source, said measuring means having common outer base portions interconnected to a coupling means where said coupling means provides for a rigid torque coupling about a first displacement axis and provides for a flexible coupling along said first displacement axis, said measuring means having common inner base portions interconnected to a support means, said inner and outer base portions respectively having capacitor plates for obtaining capacitor measurements, said inner and outer base portions respectively being connected by torque beam means whereby torque applied to one of said outer base portions relative to one of said inner base portions produces a simultaneous change in the capacitance measurements, force means coupled between said outer base portions and said support means and responsive to pressure the developing torque as a function of pressure to the one of said outer base portions, independent electrical means coupled to each of said capacitors for deriving independent capacitance measurements as a function of pressure.

25. The capacitor device as set forth in claim 24 wherein the torque beam means include beam portions which are constructed from a high strength material having good elastic characteristics and wherein said force means is a Bourdon tube arranged in a coil about a coil axis for developing a torque force which does not exceed the micro yield point to the torque beam portions and wherein said coil axis is aligned with said displacement axis.

26. The capacitor device as set forth in claim 24 wherein the torque beam means include beam portions which are constructed from a high strength metal material having good elastic characteristics with a macro yield point above the working stress levels in said torque beam portions.

27. The capacitor device as set forth in claim 24 wherein the torque beam means includes beam portions which are constructed from a material having good elastic characteristics with a micro yield point above the working stress levels in said torque beam portions.

28. The capacitor device as set forth in claim 24 wherein the torque beam means includes beam portions which are constructed from a high strength metal material having good elastic characteristics in the stress range of said torque beam portions.

29. The capacitor device as set forth in claim 24 wherein the force means is a Bourdon tube arranged about a coil axis for developing a torque force which does not exceed the micro yield point of said torque beam means.

30. The capacitor device as set forth in claim 24 wherein said coupling means includes flexible beam members having a cross section with structural rigidity about said elongated axis and structural flexibility along said elongated axis.

31. The capacitor device as set forth in claim 30 wherein said inner and outer base portions are constructed from a common high strength metal material having high strength and good elastic characteristics.

* * * * *